Jan. 18, 1949.   J. C. ZIMMER ET AL   2,459,483
CONTINUOUS METHOD FOR DETERMINING THE
APPARENT VISCOSITY OF A GREASE
Filed Dec. 6, 1944   2 Sheets-Sheet 1
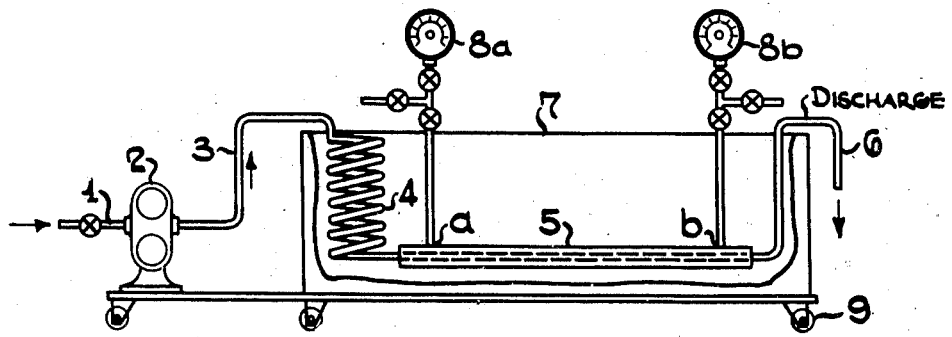
FIG.-1
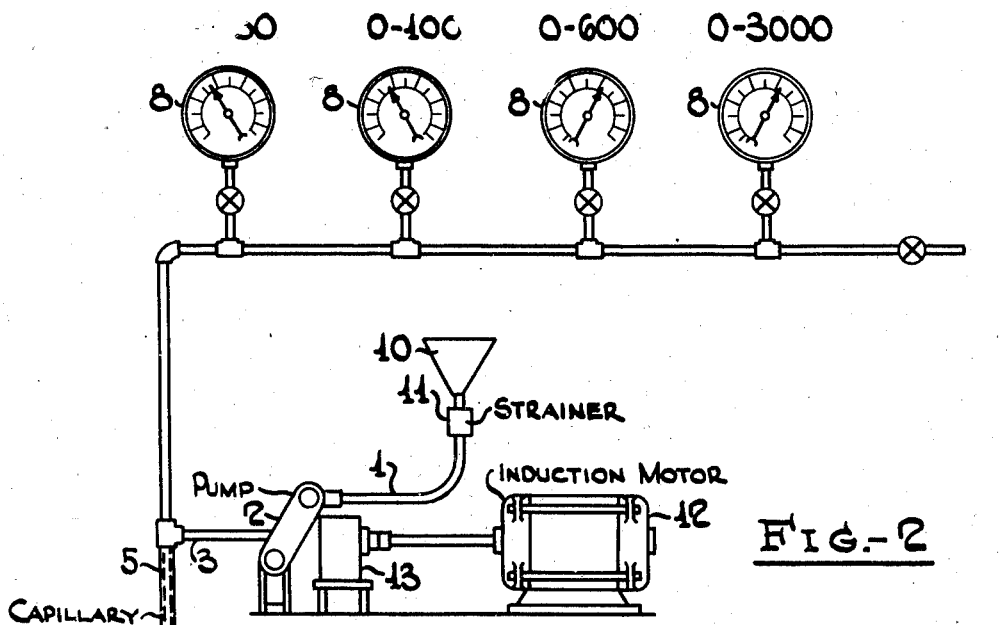
FIG.-2
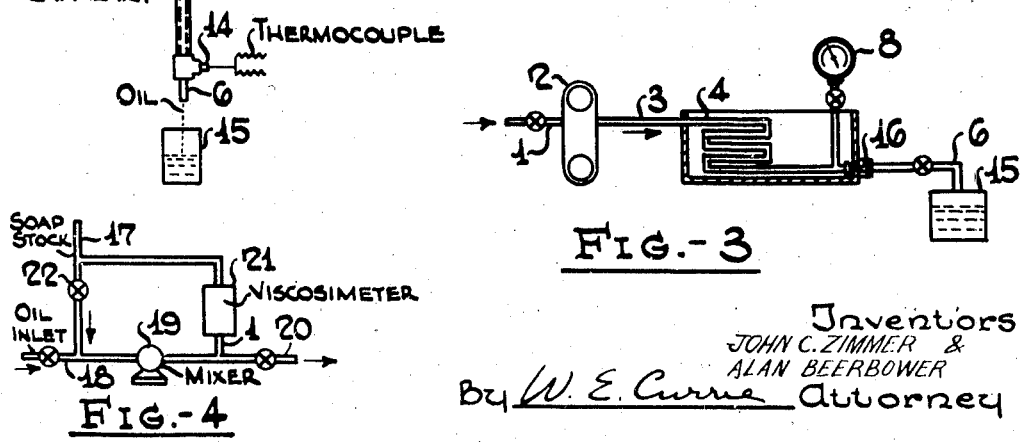
FIG.-3
FIG.-4
Inventors
JOHN C. ZIMMER &
ALAN BEERBOWER
By W. E. Currie  Attorney Jan. 18, 1949.    J. C. ZIMMER ET AL    2,459,483
CONTINUOUS METHOD FOR DETERMINING THE
APPARENT VISCOSITY OF A GREASE
Filed Dec. 6, 1944    2 Sheets-Sheet 2
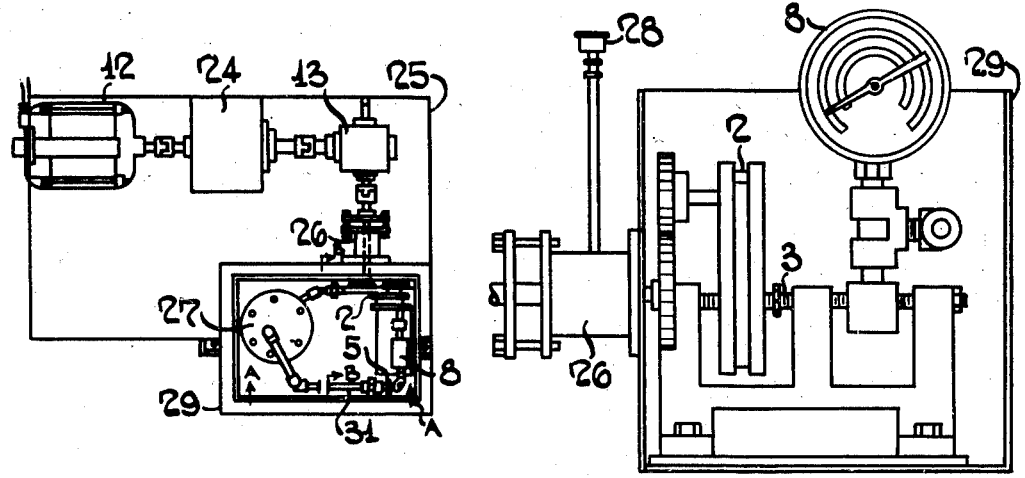
Fig.-5
Fig.-7
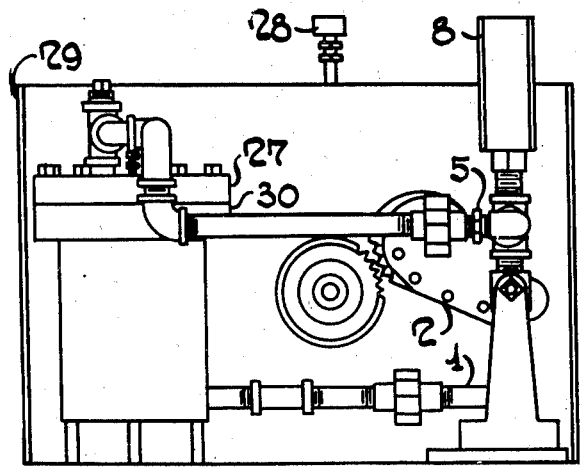
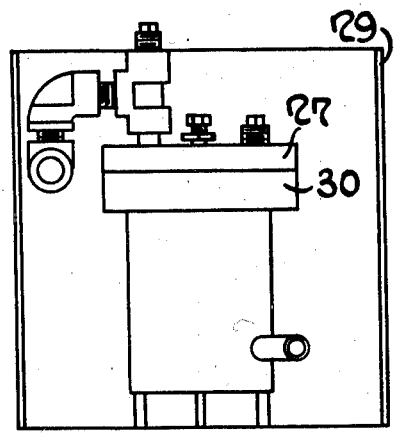
Fig.-6
Fig.-8
Inventors
JOHN C. ZIMMER &
ALAN BEERBOWER
By W. E. Currie    Attorney Patented Jan. 18, 1949

2,459,483

UNITED STATES PATENT OFFICE 2,459,483

CONTINUOUS METHOD FOR DETERMINING THE APPARENT VISCOSITY OF A GREASE

John C. Zimmer, Union, and Alan Beerbower, Westfield, N. J., assignors to Standard Oil Development Company, a corporation of Delaware Application December 6, 1944, Serial No. 566,904

2 Claims. (Cl. 73—55)

This invention relates to novel methods of measuring the viscosity of a liquid or plastic, especially a lubricating grease, and novel apparatus therefor. This application is a continuation-in-part of our U. S. application 445,114 filed May 30, 1942, now abandoned.

For the continuous manufacture of lubricating greases, as disclosed in the patent of A. E. Calkins, U. S. 2,318,668, May 11, 1943, one of the most important problems is the control of the viscosity of the grease, it being desirable that the grease produced should have fairly uniform consistency, or in other words, a relatively narrow spread in viscosity range when working under any particular manufacturing formula and under any one particular set of operating conditions. Heretofore the lack of a suitable method for continuously and quickly ascertaining the apparent viscosity of the grease being made in a continuous process has been a serious handicap to the process, and it is one object of the present invention to provide a method for continuously measuring the viscosity of the grease so quickly and accurately that if the viscosity of the grease should vary slightly beyond certain set upper and lower limits, an adjustment can quickly be made in one or more of the grease manufacturing steps in order to maintain the product within the desired specifications.

The general principle used in this invention is a method of measuring the consistency or viscosity of a liquid or plastic which comprises measuring its resistance to flow under fixed conditions of temperature and rate of flow. A preferred modification of the invention, in connection with the continuous manufacturing of a lubricating grease, is the continuous diversion of a portion of the grease and measuring the pressure differential near the inlet and outlet ends of a capillary tube when this portion of the grease is forced through the capillary tube under conditions of constant temperature and constant rate of flow.

The details and advantages of the invention will be better understood from a consideration of the following description and the accompanying drawings in which Figure 1 represents a schematic outline of a continuous viscosity testing apparatus comprising a capillary tube and a pressure gauge at each end thereof; Figure 2 represents a variation of Figure 1 without the constant temperature control means but shows the alternative use of a plurality of pressure gauges of different capacities; Figure 3 shows a somewhat simpler, although perhaps somewhat less accurate apparatus than that shown in Figure 1, differing therefrom in the use of only one pressure gauge and the substitution of a flow-retarding orifice of measurable length or other means of restricting the flow such as a Venturi throat of such dimensions that stream line and not turbulent flow occurs instead of a capillary tube; and Figure 4 shows in outline form the method of using the continuous viscosity tester to automatically control the proportion of oil to be mixed with a soap stock in a continuous grease manufacturing process.

In these various figures, like parts are identified by like numerals.

Referring to Figure 1, a small portion of the lubricating grease being discharged from a continuous grease manufacturing plant, not shown, is fed through line 1 into a constant volume feed, such as pump 2, through line 3, then through pipe coil 4 into the capillary tube 5 and finally out the discharge line 6. The coil 4 and capillary 5 are maintained at constant temperature by being immersed in a water bath 7 maintained at the desired temperature by known automatic temperature regulating means not shown. Pressure gauges 8a and 8b are connected to the capillary 5 at the points a and b located at or near the ends of the capillary tube 5 whereby the difference in pressure between the points a and b can readily be determined by subtracting the reading on the pressure gauge 8b from that on gauge 8a. A differential pressure gauge may be used, which subtracts automatically. This difference in pressure varies directly with the viscosity of the grease, and by checking with samples of known or standard viscosity, can be calibrated to read directly in terms of viscosity, if so desired. The calibration may also be calculated from the capillary dimensions. If desired, the temperature control bath 7 and the pump 2 may be mounted in a fixed position or may be mounted on a platform supported by rollers 9 shown in dotted lines, so that this entire viscosity testing unit mounted on the movable platform may be shifted from one grease manufacturing unit to another.

In Figure 2, grease is fed in through line 1 from a suitable source, indicated in this instance as a funnel 10, for convenience in laboratory testing, the grease passing from the funnel through strainer 11 to remove lumps or any other foreign solid particles. From feed line 1 the grease passes into the constant volume pump 2, driven by induction motor 12 by means of gear reducer 13, and thence the grease passes through line 3 into the capillary tube 5, the pressure required to force the grease through said capillary being measured by any one of a series of pressure gauges 8 having various capacities ranging from 30 lbs. to 3000 lbs., the lighter capacity gauge being used for low viscosity greases and the heavier gauge being used for high viscosity greases. The temperature of the capillary tube 5, or at least the outlet thereof, is determined by the thermocouple 14, and the grease issuing from the capillary tube is discharged through line 6 into the suitable receiver 15.

In Figure 3 grease is fed through inlet line 1 into constant volume pump 2 through line 3 into pipe coil 4, immersed in constant temperature bath 7, and out through the flow-retarding orifice 16 of measurable length and discharged through line 6 into a suitable receiver 15, the pressure required to force the grease at constant temperature and flow through the orifice 16 being measured by the pressure gauge 8 connected into the system between the pipe coil 4 and the orifice 16.

In Figure 4 a preheated soap stock fed through line 17 is continuously mixed with the preheated oil stock fed through line 18 in a suitable high speed mixer 19, such as a Lancaster disperser. A portion of the grease continuously issuing from the mixer 19 through the line 20 is taken off through line 1 into the continuous viscosity measuring unit 21 (not shown in detail) which may be of any suitable design according to the present invention as illustrated in Figure 1, 2 or 3. In the modification of the invention illustrated in Figure 4, the pressure required to force the grease through either a capillary tube, such as shown in Figures 1 and 2, or through a flow-retarding orifice, or venturi, as shown in Figure 3, is used to automatically regulate (by known means, the details of which are not shown) the opening and closing of a valve 22 in the soap stock feed line 17, although if so desired it could alternately operate a valve in the oil feed line 18. The grease used in the viscosimeter may, for economic reasons, then be returned for remixing by line 23.

In carrying out the invention, the constant volume feed pump 2 may have any desired construction, so long as it is reasonbly accurate (to within a few per cent) in feeding a constant flow of grease. A suitable pump on the market is a Zenith Model 1B, which has the following construction: It is a gear-type pump comprising two meshed gears in a close-fitting chamber. The material is picked up by the teeth and carried around on the outside edges, return of material being prevented by the meshing. Surface finish is accurate to .00001 inch. This particular pump delivers about .04 gallon per minute of grease at an operating speed of 250 R. P. M. If desired, a plurality of pumps may be used in series to build up high pressures, such as may be desirable for viscosity breakdown studies, not only for lubricating greases but also for other types of viscous fluids such as solutions of high molecular weight linear polymers of isobutylene, solid polymers of ethylene, or various coplymers of olefins, such as isobutylene-styrene coplymers, or isobutylene-butadiene copolymers, or other viscosity-increasing or colloidal agents, such as rubber, etc.

Figures 5, 6, 7 and 8 depict a simplified apparatus for continuous circulation of oils at high rates of shear and high pressure through a gear pump-capillary tube circuit. This apparatus is used for viscosity breakdown tests on hydraulic, recoil and other oils. Briefly it consists of a Zenith gear pump driven by motor through a variable speed transmission or a constant reduction gear box, which circulates the oil through a capillary tube from an oil reservoir. The gear pump and capillary tube end are enclosed in an insulated metal box so that different test temperatures can be obtained by filling the box with a liquid maintained at the desired temperature.

Instead of using a gear type pump for the constant feed, other suitable equipment can be used, if desired, such as a positive feed vane or plunger type pump, etc., provided these are designed and operated with positive action insuring feeding of the grease or other viscous fluid at a constant rate of flow.

In order to have the continuous viscosimeter of this invention respond as quickly as possible to changes in the viscosity of a continuously manufactured grease or other viscous fluid being measured, the feed line 1 between the grease source and the pump 2, and also the connecting line 3 between the pump 2 and the pipe coil 4, should be as short as possible and the pipe coil 4 should be as short as permissible while still accomplishing its primary function of maintaining the grease at the desired constant temperature for the viscosity test. By using a test temperature close to that of the fluid stream, the coil may be eliminated.

For the constant temperature control, a pipe coil, such as shown by numeral 4 in the drawings, is probably the most convenient, and such a coiled tube may be made of any suitable material but preferably of copper, aluminum or other suitable metal having good heat conductivity and yet inert to the material being tested. For observation purposes as may be desirable in laboratory installations, a coil of glass or other transparent plastic may be used. If more convenient, such as tube 4 may be used in a straight or uncoiled condition, or may be dispensed with entirely if the grease being manufactured is at a substantially constant temperature. The temperature control bath may contain any suitable type of fluid as the bath medium, water being one of the most commonly used because it is cheap and available and especially useful for any temperatures between 32° F. and 212° F., and adapts itself readily to electrical regulation by thermostatically controlled heaters. Oil or other suitable liquids may be used as the temperature control bath medium. An agitator should be used to effect circulation of the bath liquid.

For continuously measuring the resistance to flow, one or more pressure gauges may be used as indicated in the several figures of the drawing, it being preferable to use two pressure gauges, one being located at or near the inlet and the outlet ends of a capillary tube through which the grease is being forced at constant temperature and rate of flow. A Bourdon gauge is suitable. This gauge consists of a curved metal tube connected to the source of pressure. The pressure tends to straighten the tube, causing a deflection which is measured on a calibrated scale.

Instead of using two different gauges, such as 8a and 8b in Figure 1, a single differential gauge may be used in which the pressure of the grease at point a is counter-imposed (within the gauge) directly against the pressure of the grease at the point b in the capillary tube so that a single dial reading shows directly the difference between the pressures at a and b, thereby avoiding the necessity of making an arithmetical subtraction to determine the differential pressure.

Obviously, if desired, instead of using simple indicating gauges, one may use recording gauges, so as to have a written record of the pressure (or viscosity) measurements throughout any desired period of time or continuously, the recording paper being changed at regular intervals, such as every 24 hours, etc.

Inasmuch as oftentimes happens, it is desirable to manufacture lubricating greases under superatmospheric pressure (ranging from a few pounds such as 10, 20 or 40 lbs. up to several thousand pounds), it may also be desirable to have the continuous viscosimeter of this invention likewise operated under a similar elevated pressure. For instance, a superatmospheric pressure of about 40 lbs. is generally desirable to prevent evaporation of water during preparation of a lime soap grease.

Viscosity in a mineral lubricating oil is one of its most important properties which varies with changes in temperature but is substantially independent of pressure, whereas with greases, which are of a plastic solid consistency, the analogous property is termed "apparent viscosity" which is dependent not only on temperature, but also varies with the rate of shear. (Arveson, "Oil and Gas Jour." (3/31/32); Arveson, "Ind. Eng. Chem.," 24, 71 (1932), "Ind. Eng. Chem.," 26, 628 (1934); Bikerman, "Petroleum Refiner," v. 24, No. 12, p. 119, v. 25, No. 1, p. 111, v. 25, No. 2, p. 120 (1945–46), and Bulkley and Bitner, "Jour. Rheol." (3), 1, 269 (April 1930).) Although many investigators have pointed out the dependency of the apparent viscosity of greases on the rate of shear, no test procedure measuring these characteristics is in general use. Consequently, greases are usually compared on the basis of the consistency determined by penetration measurement using the A. S. T. M. penetrometer. Penetration is a rough measure of yield value, coupled with some viscosity effects. At the present time no method exists for measuring this property continuously. However, this invention fills the need since apparent viscosity at low rates of shear is predominantly a function of the yield value of a grease while apparent viscosity at high rates of shear depends chiefly on the true viscosity of the oil phase of the grease. Furthermore, penetration value cannot be translated to fundamental viscosity units for prediction of lubrication performance. For example, it is possible to compound a given quantity of calcium soap into a 100 S. S. U. at 100° F. oil and also into a 1000 S. S. U. at 100° F. oil and obtain greases of identical penetration values. An attempt, however, to lubricate a heavily loaded mine car wheel bearing with a representative high speed, textile mill grease containing the 100 S. S. U. at 100° F. mineral oil would surely lead to difficulties even though the penetration values of this grease are the same as the penetration values of a grease proper for such application.

At best, the penetration value of a grease serves as an index of the relative hardness or the amount of soap in a given sample of grease. When predicting lubricant performance, the penetration results must be supplemented by knowledge of the viscosity of the mineral oil base stock used in the grease. This has often led to the use of the empirical rule that a lubricating grease for a given application should contain a mineral oil of the same viscosity as would be employed if the equipment were oil lubricated. In addition to not giving an accurate indication of the performance characteristics of the grease, the penetration system of testing has the additional disadvantage that the test must be run at a fixed temperature of 77° F. This necessitates an extensive time interval lag for bringing the body of grease to a uniform temperature. The present invention makes available a method for immediately determining the most essential lubricating characteristics of the grease, thus dispensing with the time interval lag previously encountered.

Between 10–1000 reciprocal seconds shear rate, small variations in soap content greatly affect apparent viscosity which varies directly with worked penetration. Accordingly, in the apparatus of the present invention, the greatest sensitivity to variations in soap content and consistency is obtained by operating the apparatus within the above range of low rates of shear. Below 10 reciprocal seconds rate of shear the time interval between sampling and recording becomes excessive for good control. This is caused either by exceedingly slow flow rate or by relatively large capillary dimensions within the instrument. At rates of shear above 1000 reciprocal seconds, the effect of the viscosity of the oil becomes predominant and it is no longer possible to gauge soap content accurately. For maximum sensitivity coupled with quick response, it is preferred to run the control apparatus so as to give readings on rates of shear of about 100 reciprocal seconds. For example, two greases having worked penetrations of 220 and 245 respectively at 77° F., containing 15.5% and 14.7% of soap were tested at 100 reciprocal seconds and at 1000 reciprocal seconds rate of shear. Grease A (220 penetration at 77° F.) showed a viscosity of 114 stokes at 100 reciprocal seconds and 30 stokes at 1000 reciprocal seconds. Grease B (245 penetration at 77° F.) gave a viscosity of 88 stokes at 100 reciprocal seconds and 25 stokes at 1000 reciprocal seconds. Applied to the grease-making art, this means that the operator is able to control the soap content in a grease to within .022% per stokes at 100 reciprocal seconds and to only .16% per stokes at 1000 reciprocal seconds. This is nearly an 8 to 1 advantage.

The invention may also be used for viscosity measurements of various mineral and fatty oils and other fluids, especially fairly viscous oils, such as hydraulic oils, etc.

The following examples are given to show the practical operation of the invention in various manufacturing processes.

*Example 1*

A lubricating grease was produced continuously at a rate of about 25 lbs. per minute, the product being discharged from the grease manufacturing equipment in a pipe having an inside diameter of about 2". With a ¾" pipe a portion of said continuously manufactured grease was diverted to a continuous viscosimeter such as illustrated in Figure 1. With a Zenith Model 1B pump delivering a constant quantity of .04 gallon per minute of grease at 250 R. P. M., the grease was passed through the coil 4 which consisted of a 10-foot length of ⅛" pipe wound cylindrically, and then was forced into a capillary tube 18" long and having a ⅛" bore (.125±.001"). Two pressure gauges 8a and 8b having a capacity of 0-250 lbs. per square inch were connected to the capillary tube at the points a and b, a being located about 1" from the inlet end of the capillary tube and b being located about 5" from the outlet end of the capillary tube, in other words, about 12" away from a. With the temperatures of the coil 4 and the capillary tube held at 77° F. by means of a thermostatically controlled water bath, the readings on pressure gauge 8a ranged from about 60 to 180 lbs. per square inch, and the readings on pressure gauge 8b ranged from about 10 to 30 lbs. per square inch, the difference between the readings on the pressure gauges 8a and 8b at any one particular time ranging from about 50 to 150 lbs. per square inch. The actual hardness of the grease ranged from 350 to 200 worked penetration (A. S. T. M.) at 77° F. Since it only requires 30 seconds for grease to travel from the grease manufacturing plant discharge line past the point b in the capillary tube 5, it is apparent that this continuous viscosimeter is very satisfactory for quickly responding to any substantial changes in the viscosity of the grease being manufactured, so that if the viscosity of the product because too high or too low, either more or less oil can be used for the blending in the grease manufacturing step and thereby quickly restore the grease product to the proper or desired consistency (i. e., viscosity).

*Example 2*

High rate of shear breakdown tests were made on two oils A and B, the latter to be used as a recoil oil in anti-aircraft guns, etc.

The apparatus used in this test is shown in detail in Figures 5-8. A Zenith gear pump 2 circulates the oil being tested. An induction motor 12 operating through gear reducer 13 drives the pump at about 85 R. P. M. A Graham variable transmission 24 is used ahead of the gear reducer 13 so as to provide accurate control of the pump delivery. This equipment is mounted on a platform 25. A packing box 26 and grease cup 28 are provided between gear reducer 13 and Zenith pump 2. Iron box 29 serves as housing.

The test oil is pumped from the reservoir 30 having top flange 27, through a capillary 5, 0.022 cm. in diameter, and 1.520 cm. in length, and is then returned by line 31 to the reservoir 30. A Bourdon gauge 8 is connected to the flow line 3 ahead of the capillary 5. All piping used was ¼" seamless tubing, except an ⅛" pipe for connecting grease cup 28. The temperature of the oil in the reservoir was measured by a thermocouple.

Tests were run at room temperature and no attempt was made to control the slight temperature rise in the circulating oil. This rose to about 85° to 96° F. during the test, although, if desired, heating and cooling may be provided to maintain the oil at constant temperature.

It is not necessary to use a strainer in the flow line if the system is first thoroughly flushed with paper-filtered oil, and if precautions are taken to prevent dust and lint from getting into the oil and plugging the capillary. After flushing with the test oil and removing it from the lines as completely as possible, the reservoir was charged with 250 cc. of the sample for testing. Kinematic viscosities on the test oil at 100° F. and 210° F. were obtained before and after the shear test for calculation of viscosity and V. I. losses, if any.

The results of breakdown tests at 723,000 sec.$^{-1}$ rate of shear on samples of oil A and oil B are given below.

The following table summarizes the results of these tests:

| Sample | TEST NO. | | | |
| --- | --- | --- | --- | --- |
| | 1 Oil A | 2 Oil A | 3 Oil B | 4 Oil B |
| Rate of Shear, Sec.$^{-1}$ | 723,000 | 723,000 | 723,000 | 723,000 |
| Temperature at Start of Test, °F. | 75 | 64 | 78 | 59 |
| Viscosity Loss (Saybolt at 100) after: | | | | |
| 1 Pass | 1.7 | 1.3 | 0.2 | 0.3 |
| 5 Passes | 3.9 | 4.5 | 0.1 | 0.2 |
| 20 Passes | 4.6 | 7.8 | 0.4 | 0.4 |
| 50 Passes | | 8.9 | 0.0 | 0.6 |

Under the above test conditions, oil B showed practically no loss in viscosity, the maximum loss being 0.6 of a Saybolt second after 50 times through the capillary.

It appears that the test as set up here, using a rate of shear of 723,000 sec.$^{-1}$ and running at a room temperature of about 65-75° F. is entirely adequate for distinguishing between oil A and oil B.

It is not intended that this invention be limited unnecessarily by the specific examples of materials or equipment which have been described merely for the sake of illustration, nor unnecessarily by any theory suggested as to the operation of the invention, but only by the appended claims in which it is intended to claim all novelty inherent in the invention as well as equivalents coming within the scope and spirit of the invention.

We claim:

1. In a continuous grease manufacturing process, a method of continuously determining the apparent viscosity of a freshly prepared grease in a flowing stream which comprises passing a portion of the grease from said stream in streamline flow and under constant temperature and constant volume rate continuously through a flow-retarding device of measurable length and radius, so that the rate of shear will be in the range of 10-1000 reciprocal seconds, and measuring the difference in pressure between two points spaced substantially apart along the flow-retarding device.

2. In a continuous grease manufacturing process, a method of continuously determining the apparent viscosity of a freshly prepared grease in a flowing stream which comprises passing a portion of the grease from said stream in streamline flow and under constant temperature and constant volume rate continuously through a flow-retarding device of measurable length and radius, so that the rate of shear will be about 100 reciprocal seconds, and measuring the difference in pressure between two points spaced substantially apart along the flow-retarding device.

JOHN C. ZIMMER.
ALAN BEERBOWER.

(References on following page)

REFERENCES CITED

The following references are of record in the file of this patent:

UNITED STATES PATENTS

| Number | Name | Date |
|---|---|---|
| 1,944,243 | Kegl et al. | Jan. 23, 1934 |
| 2,042,860 | Peabody et al. | June 2, 1936 |
| 2,131,379 | Lay | Sept. 27, 1938 |
| 2,208,444 | Bailey | July 16, 1940 |
| 2,272,970 | Frymoyer | Feb. 10, 1942 |
| 2,309,910 | Kott | Feb. 2, 1943 |
| 2,318,668 | Calkins | May 11, 1943 |
| 2,322,814 | Binckley | June 29, 1943 |
| 2,339,991 | Hagy | Jan. 25, 1944 |
| 2,392,662 | Greisheimer | Jan. 8, 1946 |